UNITED STATES PATENT OFFICE.

GEBHARDT KNOEPFLER, OF BALTIMORE, MARYLAND.

COMPOSITION OF MATTER FOR MAKING FLY-PAPER.

1,084,091. Specification of Letters Patent. Patented Jan. 13, 1914.

No Drawing. Application filed September 6, 1913. Serial No. 788,434.

*To all whom it may concern:*

Be it known that I, GEBHARDT KNOEPFLER, a citizen of the United States, residing at Baltimore city, State of Maryland, have invented certain new and useful Improvements in Compositions of Matter for Making Fly-Paper, of which the following is a specification.

My invention relates to an improvement in a composition of matter used in the manufacture of what is termed fly paper and the like, and has for its object to provide a glutinous compound capable of being spread or painted upon paper or other suitable objects for the purpose of causing flies or other insects which come into contact therewith to adhere thereto and become imprisoned thereon whereby their destruction is accomplished.

My invention has for its further object to provide a composition which will retain its adhesive qualities a sufficient length of time, and which may be manufactured at a comparatively small cost, and which may be easily and quickly applied to the objects desired.

My composition consists of the following ingredients, combined in the proper proportions, stated, viz;

| | |
|---|---|
| Linseed oil | 1 gallon. |
| Castor oil | 1 gallon. |
| Beeswax | 3½ pounds. |
| Rosin | 36 pounds. |

These ingredients are to be thoroughly mingled or mixed by agitation while being subjected to heat of approximately 180 degrees for a period of approximately twenty minutes, care being taken that the composition while being heated should not be permitted to become heated to a boiling point.

The composition after being permitted to cool is then ready for use, and may be applied to the desired objects by any suitable means, such as an ordinary paint brush, or the object desired to be coated may be dipped in the composition as may be deemed desirable or most advantageous.

What I claim as new and desire to secure by Letters Patent, is;

The herein described composition of matter for the manufacture of fly paper, consisting of linseed oil one gallon, castor oil one gallon, beeswax three and one half pounds, and rosin thirty six pounds, substantially as described.

In testimony whereof I affix my signature in presence of two witnesses.

GEBHARDT KNOEPFLER.

Witnesses:
   E. WALTON BREWINGTON,
   JAMES F. JOHNSON.